G. HOFMANN.
PNEUMATIC TIRE.
APPLICATION FILED FEB. 13, 1917.
1,347,950.
Patented July 27, 1920.
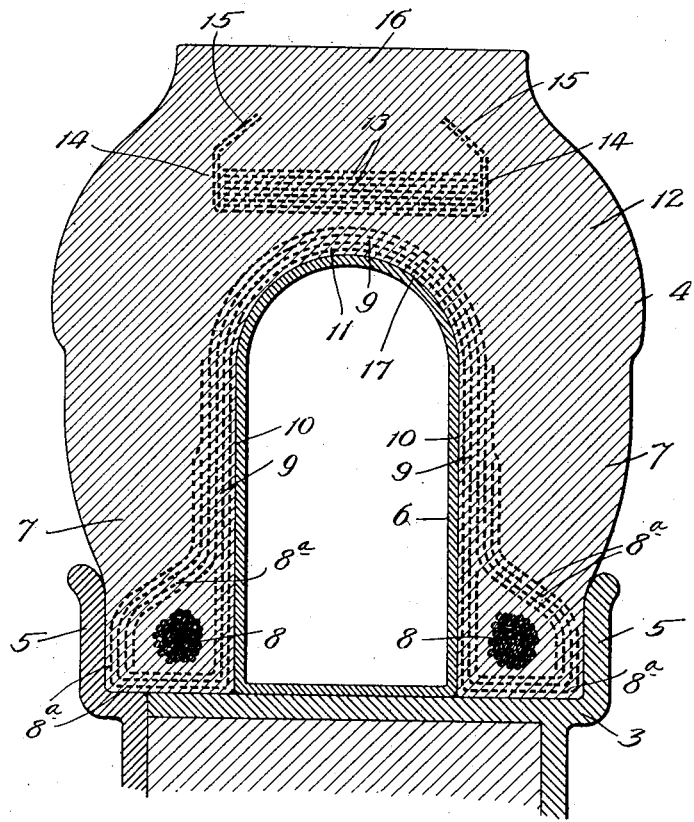
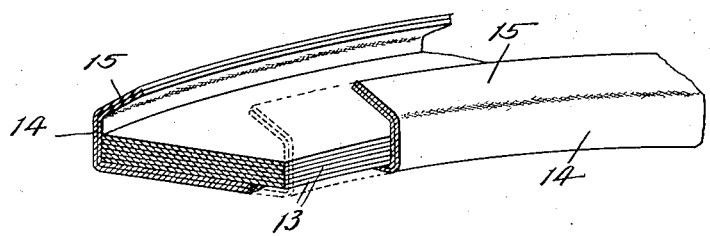
Witnesses:
Inventor:
George Hofmann,

UNITED STATES PATENT OFFICE.

GEORGE HOFMANN, OF CHICAGO, ILLINOIS, ASSIGNOR TO HOFMANN-MORGAN RUBBER COMPANY, OF CHICAGO, ILLINOIS, A CORPORATION OF ILLINOIS.

PNEUMATIC TIRE.

1,347,950.   Specification of Letters Patent.   Patented July 27, 1920.

Application filed February 13, 1917. Serial No. 148,310.

*To all whom it may concern:*

Be it known that I, GEORGE HOFMANN, a citizen of the United States, residing at Chicago, in the county of Cook and State of Illinois, have invented a new and useful Improvement in Pneumatic Tires, of which the following is a specification.

My invention relates more particularly to pneumatic tires for trucks and other vehicles of a similar character, wherein it is desired that the tires be of sufficient resiliency to relieve the vehicle of undue shock in passing over rough roads.

As a preface to a description of the invention it may be stated that while a certain amount of resiliency is necessary in a tire for use on a truck or similiar vehicle, to properly cushion the vehicle, especially in traveling over rough roads, the same amount of resiliency, as required for passenger-carrying vehicles, is not necessary, and the efforts of manufacturers of tires have been directed to the production of vehicle tires possessing the requisite amount of resiliency and involving the minimum expense in their production, as well as to produce a tire which will present the maximum wearing qualities under the loads for which they are intended.

My primary object is to provide a novel construction of pneumatic tire for use, more particularly, on vehicles as above stated, which shall present the desired degree of resiliency, especially for trucks and the like vehicles, which shall not be subject to the objectionable so-called "rim-cutting," as is the case with pneumatic tires as hitherto constructed, which shall possess wearing qualities to a high degree in proportion to the amount of material forming the structure, and other objects, as will be manifest from the following description.

Referring to the accompanying drawing, Figure 1 is a section taken through a tire constructed in accordance with my invention and a rim on which it is supported, the section lines of the tire being omitted to avoid confusion; and Fig. 2, a broken, perspective, view of a portion of the circumferential reinforcement forming a part of the tire illustrated in Fig. 1.

The type of pneumatic tire in connection with which my invention is illustrated is that involving an outer casing which is channeled along its inner periphery, and an inflatable inner tube. A rim, such as is commonly employed on the wheels of trucks, is represented at 3, the outer casing of my improved tire, at 4, and shown as held between the annular flanges 5 of the rim, and the inner inflatable tube at 6.

In accordance with my invention the sides of the tire, instead of being relatively thin and flexible, adjacent the tire - retaining flanges of the wheel, as is common in pneumatic tires, are formed to be relatively non-resilient to present relatively non-yielding ringlike sections at opposite sides of the tire structure and which sections, forming the sides of the outer casing, extend about the rim 3 in a plane substantially parallel with the plane of the face of the wheel. The above - referred - to relatively non - yielding portions of the tire are represented generally at 7, and are constructed in any suitable manner to produce the said effect. In the particular construction shown the tire is formed, as is usual with pneumatic tire-casings, of reinforcing fabric and rubber vulcanized thereon, with preferably endless bands or rings 8 of reinforcing material, such as metal cable, embedded in the portion of the casing adjacent the inner periphery thereof. A mass of reinforcing fabric is represented at 9, this mass being formed into arc-shape, as illustrated, with the substantially flat parallel sides 10 which are disposed substantially parallel with the plane of the face of the wheel. The mass 9 is formed of a number of layers of the fabric referred to, the fabric being preferably laid in courses, as represented in Fig. 1, to form the relatively heavy reinforced portion 8ª around the reinforcing cables 8, the reinforcing material being of graduated thickness from the center of the tire radially outward, as represented in Fig. 1, up to substantially the point at which the mass 9 presents the arc-shaped portion 11. In other words, the reinforcement in the sides 7 of the tire, and which reinforcement it will be understood extends preferably continuously about the circumference of the tire, is relatively heavy up to the point at which the arch 11 springs from the parallel portions 10 of the mass 9 of the reinforcement. In the formation of the tire the reinforcing material above described is combined with the body 12 of rubber which is preferably built up to be relatively thick at the side portions 7 of the tire, the rubber and reinforcing material being molded together in accordance with common practice.

In accordance with the preferred embodiment of my invention a band 13 of reinforcing material is preferably embedded in the rubber of the tire to extend circumferentially about the tire and around the reinforcing mass 9, as shown in Fig. 1, this band being preferably of such diameter that there will be a very thin layer of the rubber of the tire between the reinforcement 9 and the band 13, as illustrated, this band being preferably positioned substantially at the central portion of the tire as shown. The band 13 may be constructed in any suitable way and formed of any suitable material provided it is capable of resisting stresses tending to expand it circumferentially. In the particular construction illustrated the band 13 is shown as formed of a plurality of layers of fabric formed of a long strip of fabric of the character usually employed as reinforcement in pneumatic tires, wound upon itself to produce a band of the desired diameter, with the various turns of the strip bonded together in any suitable way, the two lowermost turns of the strip, or more or less as is desired, and forming the reinforcing band 13, being considerably wider than the uppermost layers of this band and so woven or formed that the lateral edges of these two lowermost layers may be turned outwardly throughout the circumference of the band 13, as represented at 14, and thence inwardly toward each other from the opposite sides of the band, to form about the circumference of the band 13 the annular ring-portions 15 which are embedded in the rubber of the tire, the latter being provided in a relatively thick layer, as shown at 16 about the periphery of the tire.

The inner tube 6 of the tire, and which is inflatable, as in the case of the usual inner tubes of pneumatic tires, is preferably of a cross-sectional form corresponding generally to the cross-sectional contour of the chamber or channel in the outer casing 4 for receiving the inner tube, this channel extending, as will be understood from the foregoing description, continuously about the inner periphery of the outer casing 4. In other words, the cross-sectional shape of the inner tube is such as to present parallel sides corresponding with the sides 10, an arc-shaped side corresponding with the shape of the portion 11 of the reinforcing material and a flat side corresponding with the circumference of the rim 3.

The provision of the reinforcement 9, as shown and described, when the inner tube is inflated, serves to render the side portions 7 of the tire relatively non-yielding, as compared with the portion of the tire adjacent the arc-shaped portion 11 of the reinforcement, the idea being to form the sides 7 so that they will be comparatively rigid. These sides, virtually present relatively rigid ring-portions which are spaced apart upon the rim 3 of the wheel, and extend substantially parallel with each other and parallel with the face of the wheel and thus practically all of the resiliency in the tire is afforded by the portion thereof adjacent the section 11 of the reinforcing material. It will be readily understood that a tire, constructed in accordance with my invention, will present all of the resiliency necessary for its effective operation on a truck or similar vehicle, and by reason of the provision of the side portions 7 thereof as described, the danger of "rim-cuts" is practically eliminated.

The feature of my invention as just described has utility in a tire either with or without the reinforcing band 13, and I therefore wish to be understood as not intending to limit the invention, as to its broadest feature, to a construction in which the reinforcing member 13 is employed. The band 13, however, serves to perform a useful function, inasmuch as it serves, in the event of impact against the tire, to relieve the inner reinforcement of the stress produced by the blow and which otherwise would be taken practically wholly by the inner reinforcement, and this is important, inasmuch as the inner portion of the tire should be maintained in unimpaired and unstrained condition to prevent blow-outs. In other words, when a blow is struck against the periphery of the tire the greater part of the blow is taken by the band 13 and distributed circumferentially about the tire, instead of causing all of the stress to be taken by the reinforcement 9. Furthermore, by the provision of the coöperating sections 13 and 9 of reinforcement, due to the fact that the stress, to which the tire is subjected, is resisted by these sections of reinforcement in certain proportions, depending upon their relative resistances to stress, each of these sections is caused to resist less than the full stress and therefore the amount of air-pressure required to be carried in the tire, as compared with the ordinary form of pneumatic tire, is proportionately less, and thus the fabric of the tire is to this extent relieved of stress.

Another advantage lies in the fact that where the band 13 is employed the tire portion 11 of the inner reinforcement may be made relatively light for a given load, as compared with the amount of reinforcement required at this point when the band 13 is eliminated, and thus a high degree of resiliency may be afforded to the tire at the portion 11. The inner reinforcement, however, may be provided in such amount as is calculated to sustain the load to which the tire is to be subjected, and the provision of the band 13 in such case would serve to produce, among other advantages, that of preserving the inner reinforcement against impairment.

It will also be noted that by the employment of the band 13 the tire is rendered much more resistant to punctures than in the case of the ordinary pneumatic tire.

While I have illustrated and described a particular construction of tire in which my invention is embodied, I do not wish to be understood as intending to limit it thereto, as the same may be variously modified and altered, without departing from the spirit of my invention, it being my intention to claim my invention as fully and completely as the prior state of the art will permit.

What I claim as new and desire to secure by Letters Patent is—

1. A pneumatic tire comprising a casing containing a comparatively narrow vertically elongated annular channel, reinforcing material in the walls of the casing extending circumferentially thereof and surrounding said channel, the said reinforcement being of relatively greater thickness adjacent the sides of the channel and of diminishing thickness adjacent the tread end thereof, and a traction surface on said casing of a width not less than the width of said channel.

2. A pneumatic tire comprising a casing containing a comparatively narrow vertically elongated annular channel, the body of the casing at the sides of said channel being of relatively greater thickness than that portion of the same adjacent the tread end of said channel, reinforcing material in the walls of the casing extending circumferentially thereof and surrounding said channel, the said reinforcement being of relatively greater thickness adjacent the sides of the channel and of diminishing thickness adjacent the tread end thereof, and a traction surface on said casing of a width not less than the width of said channel.

3. A pneumatic tire comprising a casing containing a comparatively narrow vertically elongated channel, reinforcing material in the walls of the casing extending circumferentially thereof and surrounding said channel, the said reinforcement being of relatively greater thickness adjacent the sides of the channel and of diminishing thickness adjacent the tread end thereof, and a second reinforcement in the casing closely adjacent that portion of said first reinforcement surrounding the tread end of said channel and comprising a plurality of layers with certain layers thereof having their free edges turned at an angle to the others to form annular ring portions inclosing the edges of the other layers of such reinforcement, and a traction surface on said casing of a width not less than the width of said channel.

GEORGE HOFMANN.